United States Patent
Medina Acosta et al.

(10) Patent No.: US 11,234,289 B2
(45) Date of Patent: Jan. 25, 2022

(54) METHODS, NETWORK NODE AND WIRELESS DEVICE FOR DISCONTINUOUS TRANSMISSION

(71) Applicant: Telefonaktiebolaget LM Ericsson (publ), Stockholm (SE)

(72) Inventors: Gerardo Agni Medina Acosta, Märsta (SE); Mark Curran, County Carlow (IE); Cecilia Eklöf, Täby (SE); Nianshan Shi, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 22 days.

(21) Appl. No.: 16/336,501

(22) PCT Filed: Sep. 27, 2017

(86) PCT No.: PCT/SE2017/050938
§ 371 (c)(1),
(2) Date: Mar. 26, 2019

(87) PCT Pub. No.: WO2018/063064
PCT Pub. Date: Apr. 5, 2018

(65) Prior Publication Data
US 2020/0120744 A1   Apr. 16, 2020

Related U.S. Application Data

(60) Provisional application No. 62/400,661, filed on Sep. 28, 2016.

(51) Int. Cl.
*H04W 76/28* (2018.01)
*H04W 72/04* (2009.01)
*H04W 52/02* (2009.01)

(52) U.S. Cl.
CPC ....... *H04W 76/28* (2018.02); *H04W 72/0446* (2013.01); *H04W 52/0216* (2013.01)

(58) Field of Classification Search
CPC ............. H04W 76/28; H04W 72/0446; H04W 52/0216; H04W 72/0406; H04W 72/0413
See application file for complete search history.

(56) References Cited

U.S. PATENT DOCUMENTS

2009/0316575 A1* 12/2009 Gholmieh ............. H04W 76/28
370/225
2010/0238829 A1* 9/2010 Sambhwani ............ H04L 5/001
370/252

(Continued)

FOREIGN PATENT DOCUMENTS

CN      101179825 A     5/2008
JP       5965970 B2     8/2016

(Continued)

OTHER PUBLICATIONS

Qualcomm, "DC-HSUPA Working Assumptions", Mar. 23-27, 2009, 3GPP TSG-RAN WG1 #56bis, Seoul, South Korea, R1-091155. (Year: 2009).*

(Continued)

*Primary Examiner* — Michael K Phillips
(74) *Attorney, Agent, or Firm* — Christopher & Weisberg, P. A.

(57) ABSTRACT

A network node (200), a wireless device (202) and methods therein, for handling discontinuous transmission, DTX, in a communication using multiple uplink carriers. The communication involves a primary uplink carrier using a first Transmission Time Interval, TTI and a secondary uplink carrier using a second TTI which is different than the first TTI. Values of DTX parameters defined for only one of the first and second TTIs are selected (2:4) for the communication, and the wireless device (202) is instructed (2:7) to (Continued)

use the selected values of DTX parameters for transmission on both the primary uplink carrier and the secondary uplink carrier. Thereby, misalignment of DTX cycles employed on the two uplink carriers can be avoided or reduced.

28 Claims, 6 Drawing Sheets

(56) References Cited

U.S. PATENT DOCUMENTS

| | | | | |
|---|---|---|---|---|
| 2010/0260121 | A1* | 10/2010 | Gholmieh | H04L 27/0006 370/329 |
| 2014/0321286 | A1* | 10/2014 | Yavuz | H04L 1/0007 370/236 |
| 2016/0056944 | A1* | 2/2016 | Cave | H04W 28/0284 370/336 |
| 2017/0171907 | A1* | 6/2017 | Agarwal | H04W 52/0216 |
| 2021/0112420 | A1* | 4/2021 | Vajapeyam | H04L 1/0009 |

FOREIGN PATENT DOCUMENTS

| | | |
|---|---|---|
| RU | 2443059 C2 | 2/2012 |
| WO | 2008131262 A1 | 10/2008 |
| WO | 2010124452 A1 | 11/2010 |
| WO | WO-2014166214 A1 * 10/2014 | ............ H04W 72/12 |

OTHER PUBLICATIONS

3GPP, "3rd Generation Partnership Project; Technical Specification Group Radio Access Network; Radio Resource Control (RRC); Protocol specification (Release 13)", 3GPP TS 25.331 V13.3.0, Jun. 2016, 1-2270.

3GPP "3rd Generation Partnership Project; Technical Specification Group Radio Access Network; UTRAN Iub interface Node B Application Part (NBAP) signalling (Release 13)", 3GPP TS 25.433 V13.3.0, Jun. 2016, 1-1386.

Unknown, Author, "Fast TTI switching mechanism for improved EUL coverage", 3GPP TSG-RAN WG2 Meeting #85, R2-140449, Prague, Czech Republic, Feb. 10-14, 2014, 1-3.

Unknown, Author, "On the "Response LS" related to the configuration of DTX along with the Rel-14 Multicarrier Enhancements for UMTS", 3GPP TSG-RAN WG1 Meeting #86bis, R1-1610235, Lisbon, Portugal, Oct. 10-14, 2016, 1-4.

* cited by examiner

METHODS, NETWORK NODE AND WIRELESS DEVICE FOR DISCONTINUOUS TRANSMISSION

CROSS-REFERENCE TO RELATED APPLICATIONS

This application is a Submission Under 35 U.S.C. § 371 for U.S. National Stage Patent Application of International Application No.: PCT/SE2017/050938, filed Sep. 27, 2017 entitled "METHODS, NETWORK NODE AND WIRELESS DEVICE FOR DISCONTINUOUS TRANSMISSION," which claims priority to U.S. Provisional Application No. 62/400,661, filed Sep. 28, 2016, the entireties of both of which are incorporated herein by reference.

TECHNICAL FIELD

The present disclosure relates generally to a network node, a wireless device and methods therein, for handling and employing discontinuous transmission, DTX, in a communication on multiple uplink carriers with different Transmission Time Interval, TTI, configurations.

BACKGROUND

In this disclosure, the term "wireless device" is used to represent any communication entity capable of radio communication with a radio network by sending and receiving radio signals, such as e.g. mobile telephones, tablets, laptop computers and Machine-to-Machine, M2M, devices, also known as Machine Type Communication, MTC, devices. Another common generic term in this field is "User Equipment, UE" which is frequently used herein as a synonym for wireless device. Functionality has been devised for wireless devices to apply Discontinuous Transmission, DTX, in order to save battery power in the wireless device and/or to reduce interference in the radio network. DTX may be applied with different predefined periodicities or of transmission, referred to as "DTX cycles" e.g. DTX cycle 1, DTX cycle 2, etc.

Further, the term "network node", is used herein to represent any node of a radio network that is operative to handle discontinuous transmission, DTX, in a communication with a wireless device using multiple uplink carriers. The network node in this disclosure may refer to a base station, radio node, Node B, base transceiver station, access point, etc., which communicates radio signals with the wireless device. The network node in this disclosure may also refer to a node in the network, such as a Radio Network Controller, RNC, that controls one or more base stations or radio nodes that communicate radio signals with wireless devices. The term "Node B" is also used frequently herein to represent such a base station or radio node.

In Rel-9 (Release 9) of the standard defined by the third Generation Partnership Project, 3GPP, Dual Carrier High-Speed Uplink Packet Access, HSUPA (DC-HSUPA) was introduced to the Universal Mobile Telecommunications System UMTS standard allowing the UE to transmit on two uplink carriers simultaneously. Later on in Rel-13, Dual-band dual-carrier HSUPA (DB-DC HSUPA) was added to the standard aiming at configuring two uplink carriers on different frequency bands. On this matter, high-frequency carriers have relatively smaller coverage than the low-frequency carriers. For example, there is a coverage difference of around 7.3 dB between a carrier operating at 900 MHz and a carrier operating at 2.1 GHz.

TTI, Transmission Time Interval, is a parameter related to encapsulation of data into frames for transmission on the radio link. TTI refers to the duration of a transmission on the radio link. The TTI is related to the size of the data blocks passed from higher network layers to the radio link layer. To combat errors due to fading and interference on the radio link, data is normally divided at the transmitter into blocks and then the bits within a block are encoded and interleaved. The length of time required to transmit one such block corresponds to one TTI.

In UMTS when a TTI of 2 ms is configured, the radio frame of 10 ms is divided into five independent sub-frames. On the other hand, when a TTI of 10 ms is configured, all the 15 slots in the radio frame are used to deliver the transport block.

Until Rel. 13, for multi-carrier scenarios the UMTS standard only allowed to configure a Transmission Time Interval, TTI, equal to 2 ms on both carriers for (DB-DC)/DC-HSUPA. Nonetheless and continuing with the evolution of the UMTS standard, a recently approved Rel-14 Work Item entitled "Multicarrier Enhancements for UMTS" will allow to configure 10 ms TTI on one or both uplink carrier frequencies in (DB-DC)/DC-HSUPA scenarios.

Enabling different TTI configurations per carrier in (DB) DC-HSUPA will open the possibility of having a variety of scenarios when using multiple uplink, UL, carriers, also referred to as UL Multicarrier. For example, since 10 ms TTI offers a better coverage than 2 ms TTI, then in DB-DC HSUPA the 10 ms TTI may be configured on the high frequency band and the 2 ms TTI may be configured on the low frequency band aiming at trying to compensate for the different propagation properties associated with each band. It is well-known that a high frequency band has poorer signal propagation and coverage than a low frequency band, and therefore it is motivated to compensate, at least to some extent, for this by using a longer TTI in the high frequency band than in the low frequency band. In general, the TTI based compensation would typically be only around 1 dB or 2 dB, while for example the coverage difference between the 900 MHz and 2 GHz bands is around 7.3 dB.

In addition, the mixed TTI configuration for UL Multicarrier will have some side effects on features that today are compatible with (DB-DC)/DC-HSUPA. For example, when aiming at reducing the UL interference and the so called "Dedicated Physical Control Channel" (DPCCH) is configured to be transmitted discontinuously, it will have to be taken into account that the periodicity or cycle length for the discontinuous transmission (DTX) of the UL DPCCH is different for 10 ms TTI as compared to the 2 ms TTI. Moreover, since aiming at achieving further UE battery savings, the periodicity of the Discontinuous Reception, DRX, is typically aligned, i.e. coordinated, with the DTX cycles, then both DTX and DRX will be impacted in (DB-DC)/DC-HSUPA scenarios having a mixed TTI configuration.

SUMMARY

It is an object of embodiments and examples described herein to address at least some of the problems and issues outlined above. It is possible to achieve this object and others by using a network node, a wireless device and methods therein, as defined in the attached independent claims.

According to one aspect, a method is performed by a network node for handling discontinuous transmission, DTX, in a communication with a wireless device using multiple uplink carriers. In this method, the network node configures or obtains a primary uplink carrier with a first Transmission Time Interval, TTI, for the communication. The network node also configures or obtains a secondary uplink carrier with a second TTI which is different than the first TTI for the communication.

The network node further selects values of DTX parameters defined for one of the first and second TTIs for the communication, and instructs the wireless device to use the selected values of DTX parameters for transmission on both the primary uplink carrier and the secondary uplink carrier.

According to another aspect, a network node is arranged to handle discontinuous transmission, DTX, in a communication with a wireless device using multiple uplink carriers. The network node is operable to configure or obtain a primary uplink carrier with a first Transmission Time Interval, TTI, for the communication, and to configure or obtain a secondary uplink carrier with a second TTI which is different than the first TTI for the communication. The above configuring or obtaining functionality may be realized by means of a configuring unit in the network node.

The network node is further operable to select values of DTX parameters defined for one of the first and second TTIs for the communication, which functionality may be realized by means of a selecting unit in the network node. The network node is further operable to instruct the wireless device to use the selected values of DTX parameters for transmission on both the primary uplink carrier and the secondary uplink carrier. The latter functionality may be realized by means of an instructing unit in the network node.

According to another aspect, a method is performed by a wireless device for employing discontinuous transmission, DTX, in a communication with a serving network node on multiple uplink carriers. In this method, the wireless device configures or obtains a primary uplink carrier with a first Transmission Time Interval, TTI, for the communication. The wireless device also configures or obtains a secondary uplink carrier with a second TTI which is different than the first TTI for the communication.

The wireless device further receives an instruction from the network node to use values of DTX parameters defined for one of the first and second TTIs for transmission on both the primary uplink carrier and the secondary uplink carrier. Finally, the wireless device applies DTX according to said values of DTX parameters in the transmission on both the primary and secondary uplink carriers.

According to another aspect, a wireless device is arranged to employ discontinuous transmission, DTX, in a communication with a serving network node on multiple uplink carriers. The wireless device is operable to configure or obtain a primary uplink carrier with a first Transmission Time Interval, TTI, for the communication, and to configure or obtain a secondary uplink carrier with a second TTI which is different than the first TTI for the communication. The above configuring or obtaining functionality may be realized by means of a configuring unit in the wireless device.

The wireless device is further operable to receive an instruction from the network node to use values of DTX parameters defined for one of the first and second TTIs for transmission on both the primary uplink carrier and the secondary uplink carrier. The latter functionality may be realized by means of a receiving unit in the wireless device. The wireless device is also operable to apply DTX according to said values of DTX parameters in the transmission on both the primary and secondary uplink carriers, which functionality may be realized by means of an applying unit in the wireless device.

Advantages that may be achieved when implementing the above network node, wireless device and methods include a reduced or even eliminated risk for misalignment of bursts when different TTIs are used by the wireless device for transmission on two uplink carriers. Thereby, the battery consumption in the wireless device can be reduced since longer periods of DTX can be applied, and also the interference in the network can be reduced by less transmissions from the wireless device.

The above network node, wireless device and methods may be configured and implemented according to different optional embodiments to accomplish further features and benefits, to be described below.

A computer program is also provided which comprises instructions which, when executed on at least one processor, cause the at least one processor to carry out either of the methods described above. A program carrier containing the above computer program is further provided, wherein the program carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

In the following description of examples and embodiments, the term UE is frequently used for short as a synonym for wireless device. Further, the term "DTX parameter value" refers to a DTX cycle length, periodicity or duration.

The Rel-14 standard "Multicarrier enhancements for UMTS" will require a revision of some existing procedures/functionalities in order to enable or realize at least some of the embodiments described herein. Among other things, the embodiments described herein are concerned with how the discontinuous transmissions of the UL DPCCH can be handled e.g. after a 10 ms TTI configuration is incorporated as part of the above-mentioned (DB-DC)/DC HSUPA scenarios.

According to the DTX parametrization described in the standard, the UL DPCCH is transmitted only during a certain number of subframes given by the "UE DPCCH burst_1" (or "UE DPCCH burst_2") with a periodicity given by the "UE DTX cycle_1" (or "UE DTX cycle_2"). Nonetheless, the set of configurable values available in the "UE DTX cycle_1" and "UE DTX cycle_2" is larger for the 2 ms TTI as compared to the configurable values available in the "UE DTX cycle_1" and "UE DTX cycle_2" for the 10 ms TTI case.

Figure 1A:
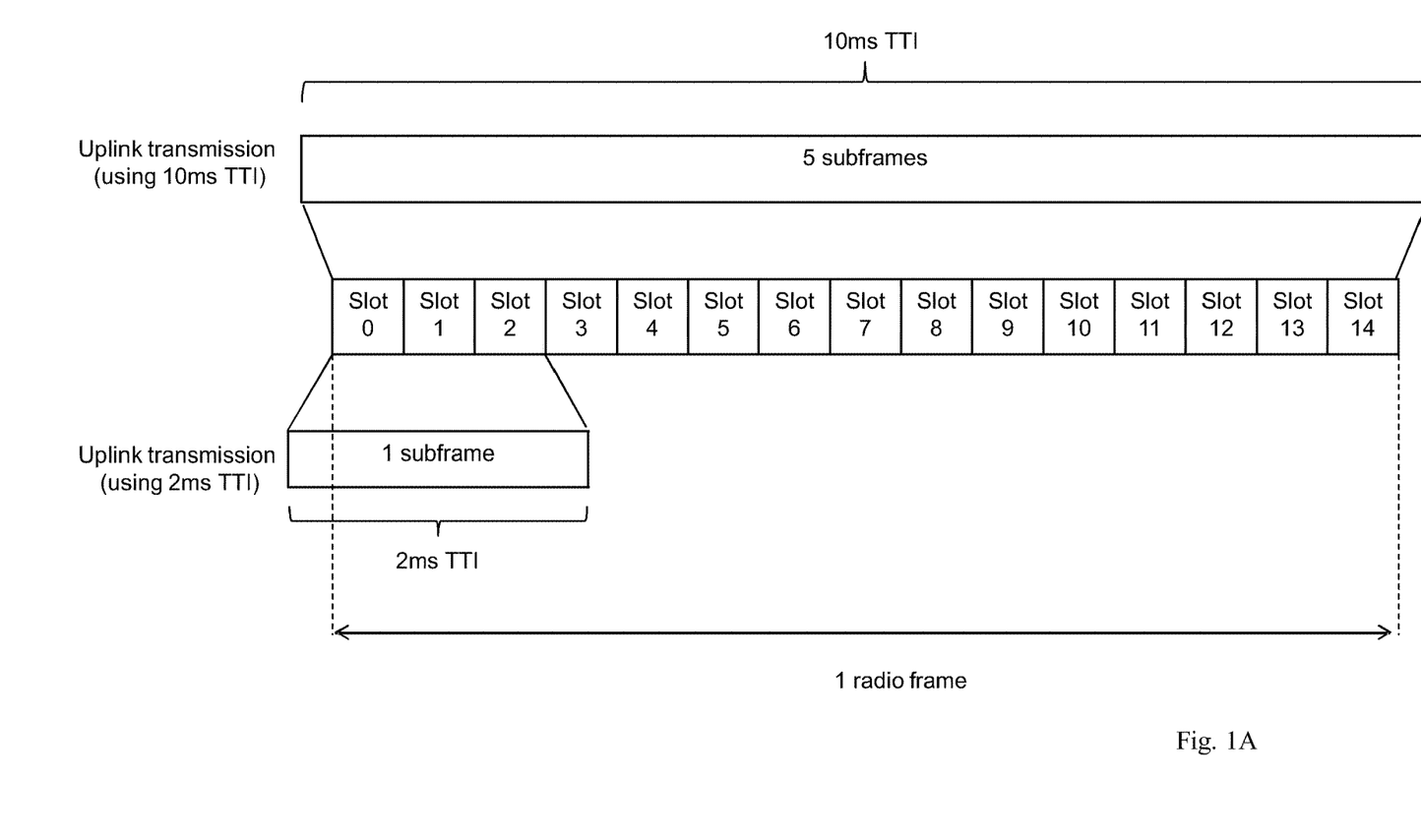
FIG. 1A is a diagram illustrating how uplink transmissions on two uplink carriers can be configured in a radio frame when using different TTIs.

FIG. 1A illustrates that one radio frame contains 15 timeslots 0-14, and that an uplink transmission with 10 ms TTI has a duration of 5 subframes corresponding to 15 timeslots while an uplink transmission with 2 ms TTI has a duration of 1 subframe corresponding to 3 timeslots. When a 2 ms TTI is configured on a carrier, the 10 ms radio frame is thus divided into five independent sub-frames, each useful to deliver a transport block. On the other hand, when a 10 ms TTI is configured on another carrier, all the 15 slots in the radio frame are used to deliver a transport block.

For example, when DTX is used on two carriers, a wireless device or UE should basically transmit uplink DPCCH bursts on the two carriers by following the DTX parametrization as given for 10 ms TTI and 2 ms TTI, respectively, which results in different DTX cycle lengths on the carriers. This situation may lead to the following drawbacks:

The "UE DPCCH burst" may be transmitted more often in one carrier as compared to the other carrier, which may result in extra UL interference, and the "UE DPCCH bursts" on the different carriers are only aligned once in a while as a function of the "least common multiple" of the DTX cycles configured on the carriers. All the bursts in between the aligned bursts are misaligned, i.e. not occurring simultaneously on the two carriers, which will be described in more detail below with reference to FIG. 1B.

Aiming at obtaining further battery savings, in the legacy the "UE DRX cycle" is typically aligned i.e. coordinated with the "UE DTX cycle", however due to the misalignments of bursts when different TTIs are used the UE would have to keep listening to the downlink during a longer time leading to more battery consumption.

The embodiments described herein may be used in a procedure for avoiding or at least reducing the potential misalignments that can occur when Discontinuous Transmission/Reception is configured along with DB-DC/DC HSUPA using different TTI configurations per carrier. This can be achieved by using values of DTX parameters defined for just one of the first and second TTIs for transmission on both the primary uplink carrier and the secondary uplink carrier which would reduce the risk of using different DTX cycle lengths on the two carriers that result in misalignment of bursts apart from the few bursts that occur simultaneously according to the least common multiple of the DTX cycles. This may be achieved by employing any of the following two examples:

When DB-DC/DC HSUPA is configured with different TTIs on each carrier, in this case exemplified by a 10 ms TTI on the primary uplink frequency or carrier and a 2 ms TTI on the secondary uplink frequency or carrier, the discontinuous transmission setup on both carriers shall in this example follow the DTX parameters defined for the 2 ms TTI case only. This means that the full set of configurable values in the "UE DTX cycle_1", and "UE DTX cycle_2" as defined in the 2 ms TTI case are fully available for the carrier configured with 10 ms TTI. In this case, the "MAC DTX cycle" functionality would have to follow the set of values defined for 10 ms TTI for the 10 ms TTI frequency carrier since it refers to E-DCH transmissions and not to "UE DPCCH burst" (i.e., the "MAC DTX cycle" would only be applicable for the original subset of values associated to the 10 ms TTI, which contains a common set for both 10 ms TTI and 2 ms TTI).

When DB-DC/DC HSUPA is configured with different TTIs on each carrier (e.g., 10 ms TTI on the primary uplink carrier frequency, and 2 ms on the secondary uplink frequency), the discontinuous transmission setup on both carriers shall in this example follow the DTX parameters defined for the 10 ms TTI case instead. This means that the configurable values of the "UE DTX cycle_1", "UE DTX cycle_2", and "MAC DTX cycle" on both carriers will be restricted to the subset of values defined for the 10 ms TTI case (i.e., only the common values in the set of 10 ms TTI and 2 ms TTI are allowed to be used).

Any of the following advantages may be achieved by employing the embodiments herein:

The potential DTX/DRX misalignments that may occur when DB-DC/DC HSUPA is configured with a different TTI per carrier may be avoided or at least reduced.

The extra amount of uplink interference that is produced when the DTX patterns on uplink carrier frequencies are misaligned may be avoided or at least reduced.

The extra battery power that would be consumed in the UE when the DTX/DRX cycles are misaligned on the uplink carrier frequencies, may be avoided or at least reduced.

In the following description of embodiments and examples of how the solution may be realized, reference will be made to standard documents, referred to as Technical Specifications TS, which are created and controlled within the third Generation Partnership Project, 3GPP.

Prior to the 3GPP Rel-14, UL Multicarrier can only be configured with 2 ms TTI on both the primary and secondary carriers, while the Discontinuous Transmission setup allows you to configure the same DTX cycle lengths on both carriers in such a way that the cycles can get aligned. In fact, in for example TS 25.433, the parameters are not explicitly provided from RNC to Node B for the secondary UL carriers, as the secondary carrier is supposed to use the same value as provided for the primary carrier.

The Technical Specifications TS 25.331/TS 25.433 describes the values that can be configured for the DTX related parameters:

2 ms TTI case:
UE DTX cycle 1: (1, 4, 5, 8, 10, 16, 20)
UE DTX cycle 2: (4, 5, 8, 10, 16, 20, 32, 40, 64, 80, 128, 160)
MAC DTX cycle: (1, 4, 5, 8, 10, 16, 20)

It should be noted that the UE may switch from UE DTX cycle 1 to UE DTX cycle 2 after a configurable period of E-DCH inactivity. The value used for the UE DTX cycle 2 is an integer multiple of the value used for the UE DTX cycle 1.

The network can configure the UE to allow E-DCH transmissions to start only at certain subframes/frames by using the "MAC DTX Cycle". This will allow the network to apply a discontinuous reception at the NodeB since it will be known when an uplink transmission may be performed.

Upon the completion of 3GPP Rel-14, the 10 ms TTI configuration will be added to the UL Multicarrier scenarios, meaning that DB-DC/DC HSUPA could be configured with 10 ms TTI on one carrier and 2 ms TTI on the other carrier. When such a mixed TTI configuration in DB-DC/DC HSUPA be used along with Discontinuous Transmissions there will be a risk of ending up with misaligned cycles on the uplink carrier frequencies. This may occur because the DTX related parameters as defined in the Technical specifications TS 25.331/TS 25.433 for the 10 ms TTI case are as follows:

10 ms TTI case:
UE DTX cycle 1: (1, 5, 10, 20)
UE DTX cycle 2: (5, 10, 20, 40, 80, 160)
MAC DTX cycle: (5, 10, 20)

As compared to the configurable values available in the "UE DTX cycle 1", "UE DTX cycle 2" and the "MAC DTX cycle" for the 2 ms TTI case, it can be noticed that the 10 ms TTI case just contain a subset of DTX cycle values for the same parameters.

The mixed TTI configuration in DB-DC/DC HSUPA may lead to the following situation. For example, in a DC HSUPA scenario a secondary UL frequency operating with 2 ms TTI may be planned to be configured with a "UE DTX cycle 1" equal to 4 subframes. Consequently, it may be desirable to configure the primary uplink frequency operating with 10 ms TTI also with a "UE DTX cycle" equal to 4 subframes, however this value is not available in the "UE DTX cycle 1" for 10 ms TTI, therefore it may be decided to configure the "UE DTX cycle" with 5 subframes.

Figure 1B:
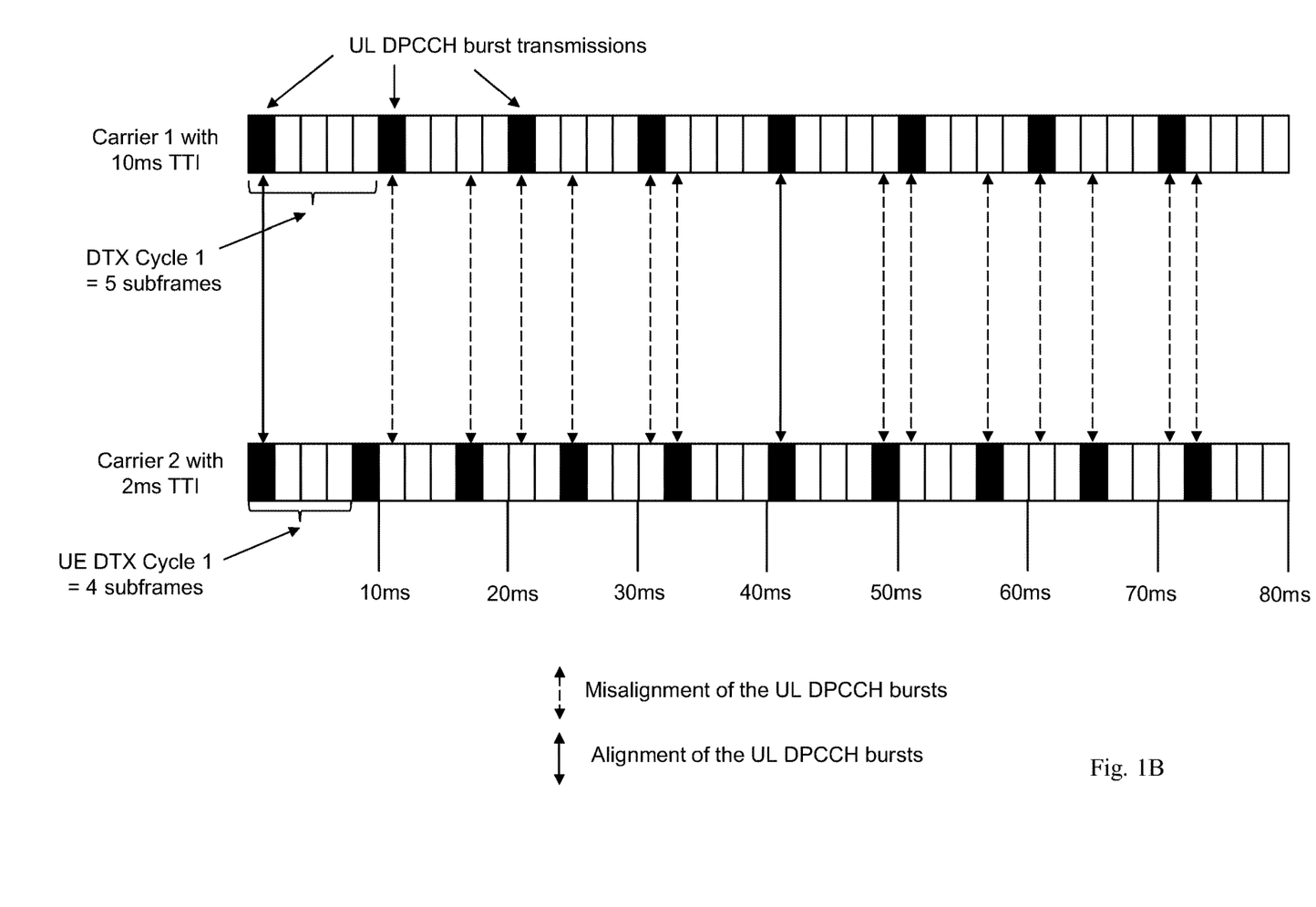
FIG. 1B is a diagram illustrating how uplink bursts according to different DTX schemes of different TTI configurations on two uplink carriers can be largely misaligned when the solution is not used.

FIG. 1B illustrates an example of how the above-mentioned misalignment of uplink bursts on two carriers can occur when different sets of DTX cycle values are used for the two carriers. In this example, the UE transmits DPCCH bursts on a first uplink carrier 1, also referred to herein as a primary uplink carrier, with 10 ms TTI and using a DTX cycle length of 5 subframes. The UE also transmits DPCCH bursts on a second uplink carrier 2, also referred to herein as a secondary uplink carrier, with 2 ms TTI and using a DTX cycle length of 4 subframes which is available for a carrier with 2 ms TTI but not for a carrier with 10 ms TTI as shown above.

Since the DTX cycle length is different on the two carriers, the uplink bursts will coincide, i.e. be aligned, only occasionally, as illustrated by two full two-way arrows, while they are misaligned most of the times, i.e. they occur separately in time, as illustrated by several dashed two-way arrows. The least common multiple of 4 and 5 is 20 so that the uplink bursts will therefore coincide only every $20^{th}$ subframe according to the full two-way arrows while all bursts in between are misaligned according to dashed two-way arrows.

As can be seen in this figure, the "UE DPCCH burst" would thus be transmitted more often in the secondary carrier of 2 ms TTI, e.g. every 4 subframes in UE DTX cycle 1, as compared to the other primary carrier of 10 ms TTI, e.g. every 5 subframes in UE DTX cycle 1, which may result in extra UL interference as well as excessive power consumption in the UE. As mentioned above, the "UE DPCCH bursts" are only aligned once in a while as a function of the "least common multiple" of the cycles configured on the carriers of 2 ms TTI and 10 ms TTI, respectively. In the above example, the "least common multiple" between 4 subframes and 5 subframes is 20 subframes, meaning that the "UE DPCCH burst" would be transmitted on both carriers at the same time only every 20 subframes, while the "UE DPCCH burst" is misaligned any other times.

Moreover, aiming at obtaining further battery savings, the "UE DRX cycle" is typically aligned with the "UE DTX cycle", but due to the misalignments the UE would have to keep listening to the downlink more frequently leading to more battery consumption.

Therefore, in order to avoid or reduce the potential misalignments that may occur when in DB-DC/DC HSUPA, where the carriers are configured with different TTIs, any of the following alternatives A and B can be used:

A. The discontinuous transmission setup on both carriers (i.e., regardless of their TTI configuration) shall only use the DTX parameters defined for the 2 ms TTI case. This means that the full set of configurable values in the "UE DTX cycle_1", and "UE DTX cycle_2", as defined in the 2 ms TTI case are fully available also for the carrier configured with 10 ms TTI. In this case, the "MAC DTX cycle" functionality would have follow the set of values defined for 10 ms TTI for the 10 ms TTI frequency carrier since it refers to E-DCH transmissions and not to "UE DPCCH burst" (i.e., the "MAC DTX cycle" would only be applicable for the original subset of values associated to the 10 ms TTI, which contains a common set for both 10 ms TTI and 2 ms TTI).

B. The discontinuous transmission setup on both carriers (i.e., regardless of their TTI configuration) shall only use the DTX parameters defined for the 10 ms TTI case. This means that the configurable values of the "UE DTX cycle_1", "UE DTX cycle_2", and "MAC DTX cycle" on both carriers will be restricted to the subset of values defined for the 10 ms TTI case, i.e., only the common values in the set of 10 ms TTI and 2 ms TTI are allowed to be used.

Figure 1C:
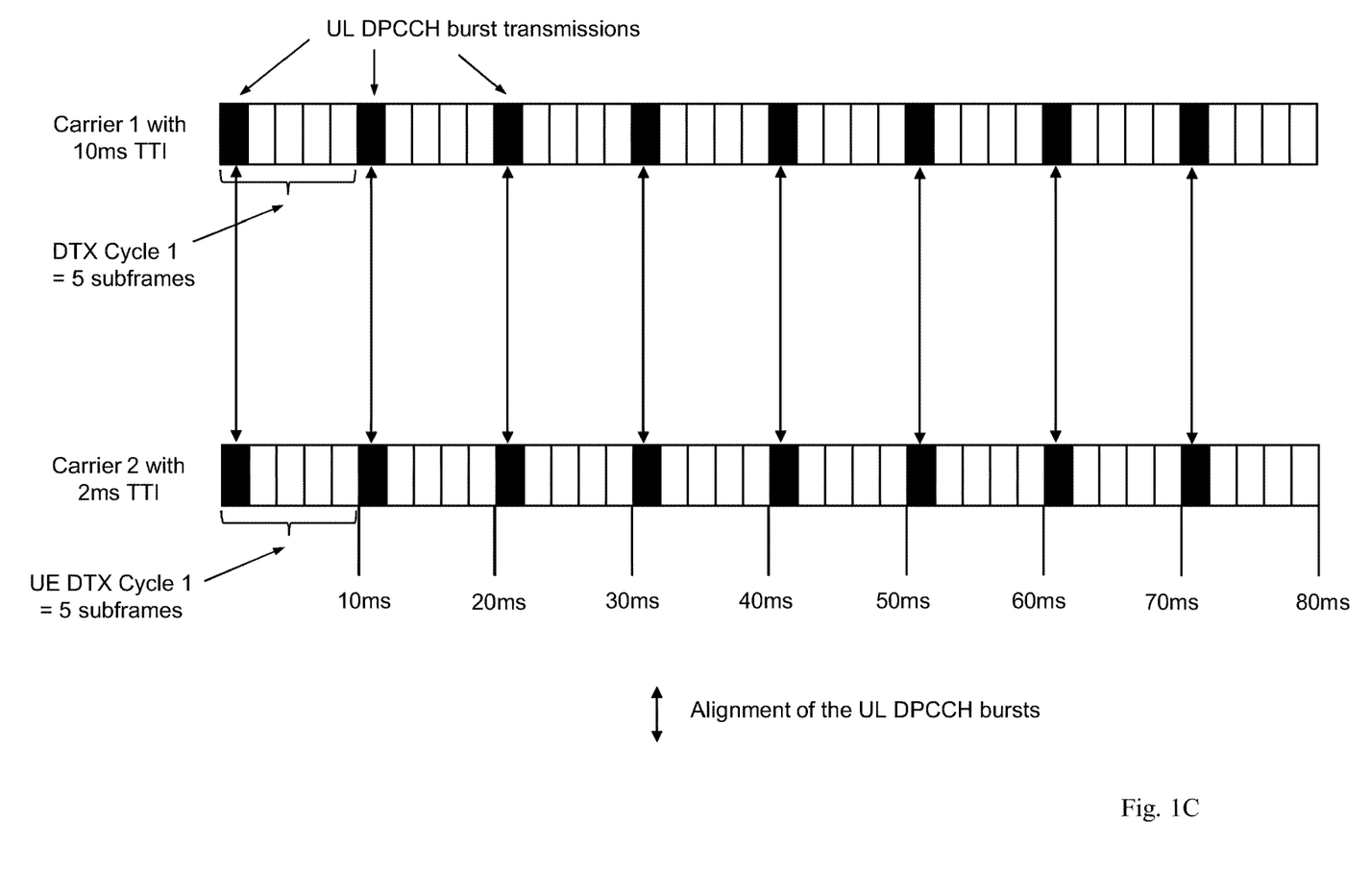
FIG. 1C is a diagram illustrating how misalignment of uplink bursts on two uplink carriers can be avoided when the solution is used, according to some possible embodiments.

FIG. 1C illustrates an example of how misalignment of uplink bursts on two carriers can be avoided by using the same set of DTX cycle values or parameters for both carriers, in this case the set of DTX parameters defined for the 10 ms TTI, see above. As in the previous example, the UE transmits DPCCH bursts on a first uplink carrier 1 with 10 ms TTI using a DTX cycle length of 5 subframes. However, in contrast to FIG. 1B, the UE transmits DPCCH bursts on a second uplink carrier 2 with 2 ms TTI using the same DTX cycle length of 5 subframes while the DTX cycle length of 4 subframes is not available in this set.

Since the DTX cycle length of 5 subframes is the same on the two carriers, the uplink bursts will always coincide, i.e. be aligned, as illustrated by full two-way arrows. Even if two different DTX cycle lengths selected from the same set would be used on the carriers, e.g. 5 subframes on one carrier and 10 subframes on the other carrier which are both available in the 10 ms TTI case, all bursts on the carrier with the longest subframes on one carrier will coincide with bursts on the former carrier, thus providing maximum alignment.

Below are some examples of how the alternatives A and B could be implemented in the technical specifications of the UMTS standard. These examples refer to various modifications that can be made in the technical specifications, which are presented as Modifications 1-8 at the end of the description.

Example Implementations of Alternative A:

A1: Define a new Information Element, IE, to convey the DTX parameters for the mixed TTI configuration (i.e. 10 ms TTI on one Uplink frequency carrier and 2 ms TTI on another Uplink frequency carrier). The new IE is introduced to the existing message, e.g. in "DTX Information", used when primary and secondary Uplink carriers are setup/added/reconfigured. The values of the IE would be as in 2 ms TTI DTX value in UE DTX Cycle 1 and UE DTX Cycle 2. The MAC DTX Cycle is using the 10 ms TTI value. The procedural text in the concerned technical specification could clarify that for DB/DC HSUPA, the DTX information will use what is defined in the primary E-DCH carrier. When RNC is going to setup the mixed TTI configuration, it would use this IE to configure both uplink E-DCH carriers. This example refers to chapter 9.2.2.66 of TS 25.433, which can be modified according to the below Modification 1. It is also possible to define MAC DTX Cycle separately for 10 ms TTI and 2 ms TTI.

A2: Introduce in the secondary Uplink carrier (e.g. in Additional E-DCH FDD Information) an explicit "Continuous Packet Connectivity DTX-DRX Information" IE. In order to be able to use the 2 ms TTI DTX values in the mixed TTI configuration, the values for the 10 ms TTI are extended to cover the values from the 2 ms DTX. In this case, it could be stated in the procedural text in the related technical specification that for mixed TTI configuration the whole set of the value is used. Note however that the MAC DTX Cycle could be remain unchanged for the 10 ms TTI. This example refers to TS 25.433 chapters 9.2.2.137 and 9.2.2.66 which can be modified according to the below Modifications 2 and 3, respectively.

A3: Introduce in the secondary Uplink carrier an explicit DTX parameter IE. To simplify, only 2 ms TTI DTX values are included. It could be stated in the procedural text in the related technical specification that for mixed TTI configuration this set of the value is used. The existing IE for the primary carrier is also needed to be extended for 10 ms TTI, or some procedural text may be used in the related technical specification to clarify. This example refers to chapter 9.2.2.137 of TS 25.433, which can be modified according to the below Modification 4.

A4: Introduce in the secondary Uplink carrier an explicit DTX parameter IE, a choice for 10 ms TTI and 2 ms TTI DTX values. However, for the 10 ms TTI, the values are extended to cover the 2 ms TTI values. It could be stated in the procedural text in the related technical specification that the extended values in the 10 ms TTI case are only used when mixed TTI configuration is setting up. The existing IE for the primary is also needed to be extended for 10 ms TTI. This example refers to chapter 9.2.2.137 of TS 25.433, which can be modified according to the below Modification 5.

Example Implementations of Alternative B:

B1: Similar as in A1 implementation, a new IE for the mixed configuration is introduced. The difference is that the new IE to convey the mixed TTI configuration would take the 10 ms TTI DTX values. This example refers to chapter 9.2.2.66 of TS 25.433, which can be modified according to the below Modification 6 which is a different approach than Modification 1. In this example, another alternative way to implement the new IE is presented. It is also possible to define MAC DTX Cycle separately for 10 ms TTI and for 2 ms TTI.

B2: Introduce in the secondary Uplink carrier (e.g. in Additional E-DCH FDD Information) an explicit "Continuous Packet Connectivity DTX-DRX Information" IE. This example refers to Modification 2. It could be stated in the procedural text in the related technical specification that for mixed TTI configuration the "UE DTX Cycle 1" and "UE DTX Cycle 2" will use the values for 10 ms TTI even if the E-DCH uplink frequency carrier is on 2 ms TTI. See also Modification 1.

B3: Introduce a new DTX Information IE in the secondary Uplink carrier. The values are the same as in the 10 ms TTI. The procedural text in the related technical specification could state that this IE is used only when mixed TTI configuration is setting up. In other words, when both uplink E-DCH carriers have the same TTI values, the secondary carrier would use what is defined for the primary E-DCH carrier. The procedural text could also state that for the primary carrier, if mixed TTI configuration is setting up, the value range is as in the 10 ms TTI (the subset).

B4: Introduce in the secondary Uplink carrier DTX Information IE, a choice for 10 ms TTI and 2 ms TTI DTX values. The procedural text in the related technical specification could state that when mixed TTI configuration is setting up, even for 2 ms TTI, the value range is as in the 10 ms TTI (the subset).

It should be noted that he above implementations for alternative A and alternative B are non-limiting examples. The approach applies on the NBAP/RNSAP interface between RNC and Node B/DRNS. For the RRC interface between the RNC and UE the baseline is a bit different as there already are separate IEs with DTX Information for primary and secondary carrier and any new implementation will be added on top of that. The below Modification 7, referring to chapter 10.3.6.34a of TS 25.331, shows an example of an implementation of alternative A where the values for 2 ms TTI are added. Alternative B contains a subset of these values, with only the values for 10 ms TTI. The procedure text in the related technical specification may also be updated describing which combinations that are allowed.

The alternatives can be implemented by adding the new information in other messages or other places, e.g. as described in the examples above.

Figure 2:
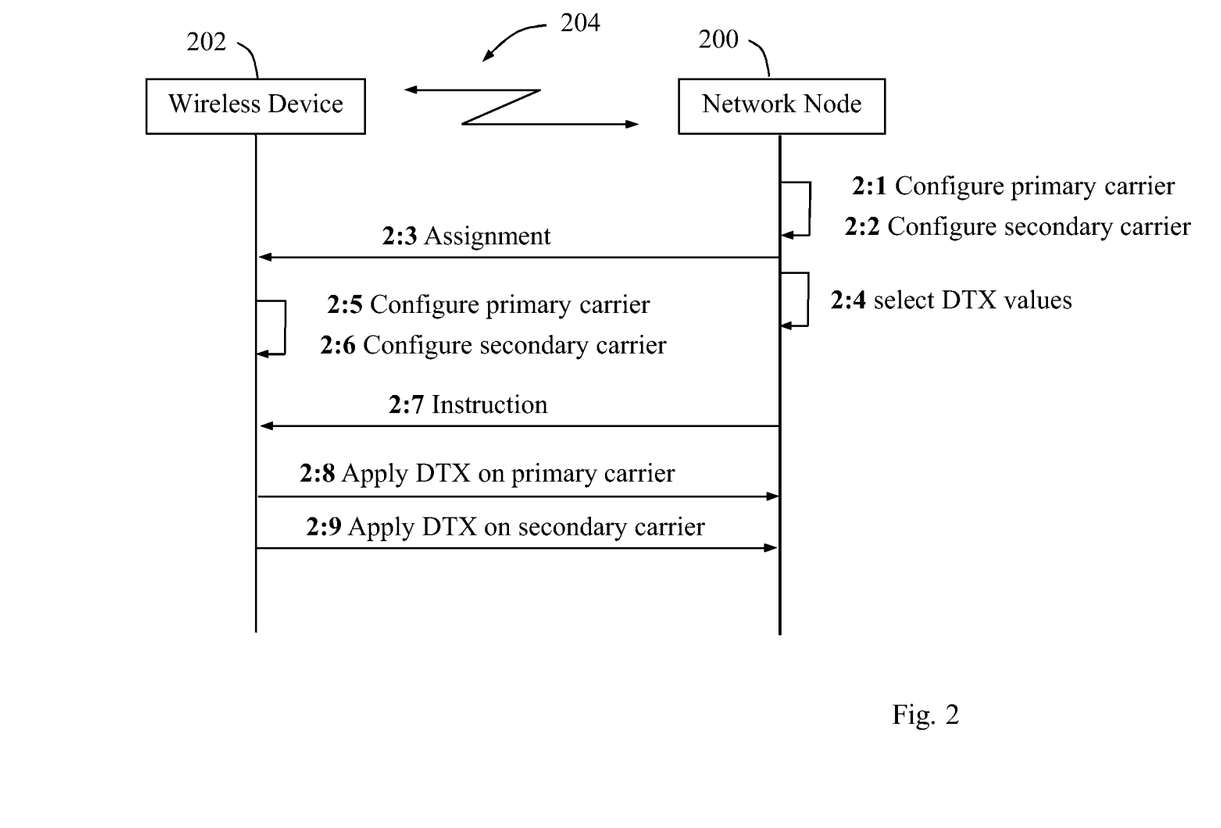
FIG. 2 is a signaling diagram illustrating an example of a procedure when the solution is used, according to further possible embodiments.

A communication scenario where the solution is employed is illustrated in FIG. 2 involving a network node 200 of a wireless network and a wireless device 202 served by the network node 200, which may communicate with each other over a wireless communication link 204, e.g. via an access node, Node B or base station, not shown. FIG. 2 is described below together with FIGS. 3 and 4. The network node may be a base station or a radio network controller, RNS that controls one or more base stations.

Figure 3:
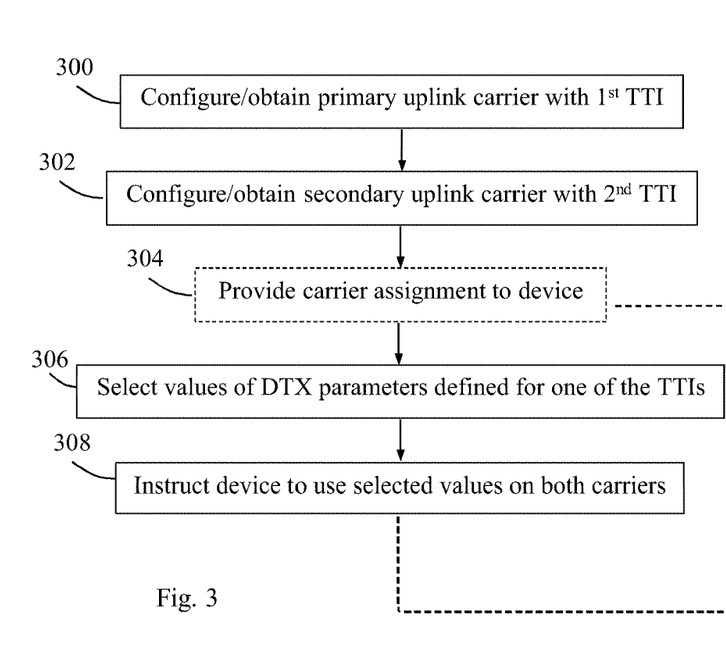
FIG. 3 is a flow chart illustrating a procedure in a network node, according to further possible embodiments.

An example of how the solution may be employed in terms of actions performed by a network node such as the network node 200, is illustrated by the flow chart in FIG. 3 which will now be described with further reference to FIG. 2. FIG. 3 thus illustrates a procedure in the network node 200 for handling discontinuous transmission, DTX, in a communication with a wireless device 202 using multiple uplink carriers. Some optional example embodiments that could be used in this procedure will also be described.

A first action 300 illustrates that the network node 200 configures or obtains a primary uplink carrier with a first Transmission Time Interval, TTI, for the communication, as also shown in action 2:1 of FIG. 2. In another action 302, the network node 200 further configures or obtains a secondary uplink carrier with a second TTI which is different than the first TTI for the communication, as also shown in action 2:2 of FIG. 2. The network node 200 may further send a carrier assignment to the wireless device 202, as shown in action 304 and action 2:3.

This carrier assignment basically informs the wireless device 202 that it can transmit bursts on the primary uplink carrier with the first TTI and also transmit bursts on the secondary uplink carrier with the second TTI.

In another action 306, the network node 200 selects values of DTX parameters defined for one of the first and second TTIs for the communication, as also shown in action 2:4 of FIG. 2. It is thus significant that DTX parameters of only one of the first and second TTIs are considered for use by the wireless device 202 for DTX in the communication. In a final action 308, the network node 200 instructs the wireless device 202 to use the selected values of DTX parameters for transmission on both the primary uplink carrier and the secondary uplink carrier, as also shown in action 2:7 of FIG. 2. Thereby, the risk for misalignment of bursts on the primary and secondary uplink carriers will be eliminated or at least reduced. In effect, the power consumption can be minimized in the wireless device 202 by minimizing the number of individual transmission occasions, and also the amount of uplink interference caused by uplink transmissions from the wireless device 202 can be likewise minimized, given the TTIs and DTX parameters used on the primary and secondary uplink carriers.

In some example embodiments, the first TTI may be 10 ms and the second TTI may be 2 ms. Alternatively, the first TTI may be 2 ms and the second TTI may be 10 ms. In another example embodiment, the network node 200 may select values of DTX parameters as defined for the TTI of 2 ms for the communication on both carriers regardless of the TTIs configured on the primary uplink carrier and the secondary uplink carrier. In an alternative example embodiment, the network node 200 may instead select values of DTX parameters as defined for the TTI of 10 ms for the communication on both carriers regardless of the TTIs configured on the primary uplink carrier and the secondary uplink carrier. In another example embodiment, which could be applied in either of the latter two embodiments above, the values of DTX parameters defined for the TTI of 10 ms may be a subset of the values of DTX parameters defined for the TTI of 2 ms. Examples of such values of DTX parameters were outlined above for the 10 ms TTI case and the 2 ms TTI case.

In further example embodiments, the DTX parameters may comprise at least one of: a first DTX cycle 1, a second DTX cycle 2, and a MAC DTX cycle. In another example embodiment, the values of DTX parameters may be selected by the network node 200 so that a DTX cycle used on the primary uplink carrier and a DTX cycle used on secondary uplink carrier are aligned. In yet another example embodiment, the communication referred to in this procedure may comprise reception of Dedicated Physical Control Channel, DPCCH, bursts from the wireless device 202.

Figure 4:
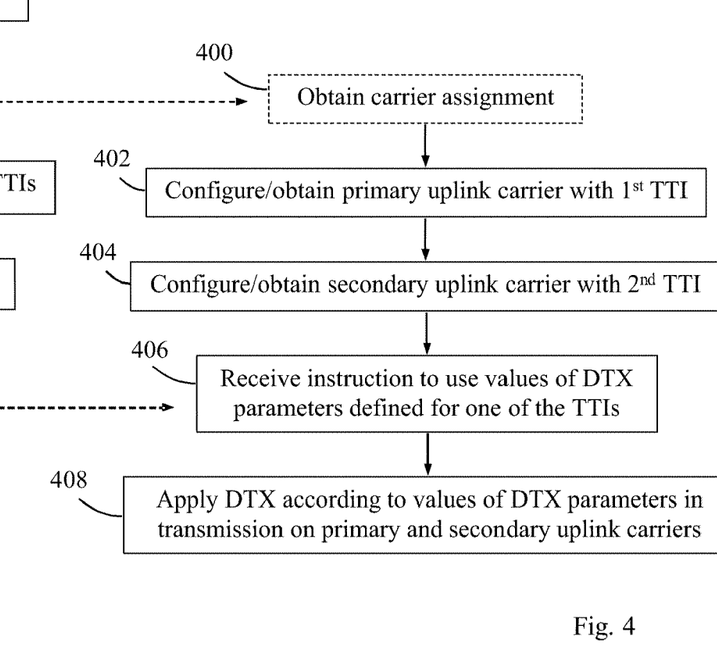
FIG. 4 is a flow chart illustrating a procedure in a wireless device, according to further possible embodiments.

Another example of how the solution may be employed in terms of actions performed by a wireless device such as the wireless device 202, is further illustrated by the flow chart in FIG. 4 which will now be described likewise with further reference to FIG. 2. FIG. 4 thus illustrates a procedure in the wireless device 202 for employing DTX in a communication with a serving network node 200 on multiple uplink carriers. Some optional example embodiments that could be used in this procedure will also be described.

A first action 400 illustrates that the wireless device 202 may obtain a carrier assignment, e.g. from the network node 200, which corresponds to action 304. The carrier assignment thus informs the wireless device 202 that bursts can be transmitted on the primary uplink carrier with the first TTI and on the secondary uplink carrier with the second TTI. A further action 402 illustrates that the wireless device 202 configures or obtains a primary uplink carrier with a first TTI for the communication, as also shown in action 2:5 of FIG. 2. In another action 404, the wireless device 202 configures or obtains a secondary uplink carrier with a second TTI which is different than the first TTI for the communication, as also shown in action 2:6 of FIG. 2.

In another action 406, the wireless device 202 receives an instruction from the network node 200 to use values of DTX parameters defined for one of the first and second TTIs for transmission on both the primary uplink carrier and the secondary uplink carrier, as also shown in action 2:7 of FIG. 2. Action 406 corresponds to action 308 and refers to values of DTX parameters selected by the network node 200 in action 306. In a final action 408, the wireless device 202 applies DTX according to said values of DTX parameters in the transmission on the primary and secondary uplink carriers, as also shown in actions 2:8, 2:9 of FIG. 2.

Some optional embodiments that may be employed by the wireless device 202 in the procedure of FIG. 4 will now be mentioned. These embodiments for the wireless device 202 correspond to the above-described embodiments for the network node 200 in the procedure of FIG. 3.

In some example embodiments, the first TTI may be 10 ms and the second TTI may be 2 ms, or alternatively the first TTI may be 2 ms and the second TTI may be 10 ms. In another example embodiment, said values of DTX parameters may be defined for the TTI of 2 ms for the communication on both carriers regardless of the TTIs configured on the primary uplink carrier and the secondary uplink carrier. In an alternative example embodiment, the values of DTX parameters may instead be defined for the TTI of 10 ms for the communication on both carriers regardless of the TTIs configured on the primary uplink carrier and the secondary uplink carrier. In another example embodiment, the values of DTX parameters defined for the TTI of 10 ms may be a subset of the values of DTX parameters defined for the TTI of 2 ms.

In further example embodiments, the DTX parameters may comprise at least one of: a first DTX cycle 1, a second DTX cycle 2, and a MAC DTX cycle. In another example embodiment, the values of DTX parameters may be applied by the wireless device 202 so that a DTX cycle used on the primary uplink carrier and a DTX cycle used on secondary uplink carrier are aligned. In yet another example embodiment, the communication with the serving network node 200 may comprise transmission of Dedicated Physical Control Channel, DPCCH, bursts by the wireless device 202.

Figure 5:
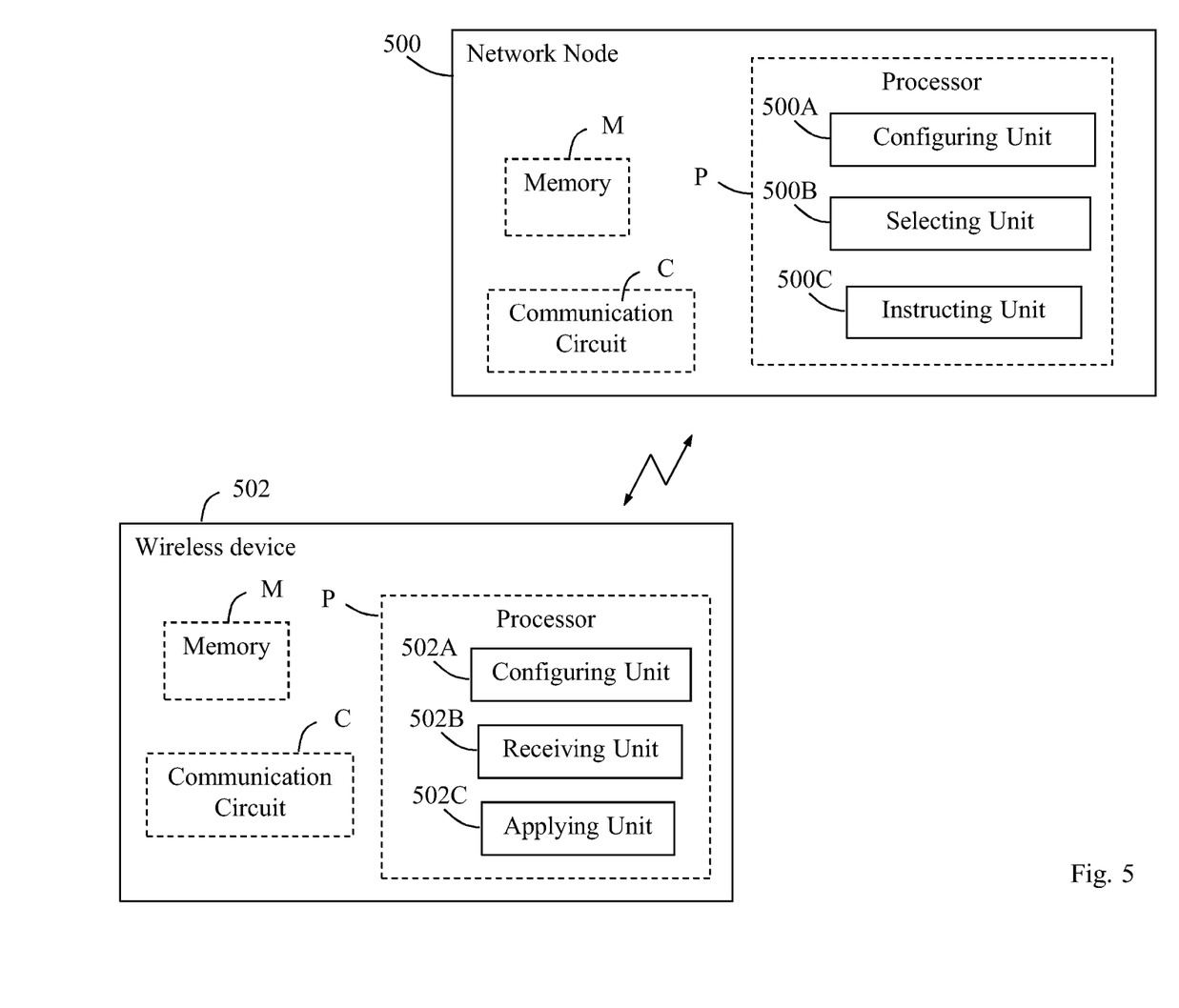
FIG. 5 is a block diagram illustrating a network node and a wireless device in more detail, according to further possible embodiments.

The block diagram in FIG. 5 illustrates a detailed but non-limiting example of how a network node 500 and a wireless device 502, respectively, may be structured to bring about the above-described solution and embodiments thereof. In this figure, the network node 500 and the wireless device 502 may be configured to operate according to any of the examples and embodiments of employing the solution as described herein, where appropriate. Each of the network node 500 and the wireless device 502 is shown to comprise a processor "P", a memory "M" and a communication circuit "C" with suitable equipment for transmitting and receiving radio signals in the manner described herein.

The communication circuit C in each of the network node 500 and the wireless device 502 thus comprises equipment configured for communication with each other using a suitable protocol for the communication depending on the implementation. The solution is however not limited to any specific types of radio signals or protocols.

The network node 500 is, e.g. by means of units, modules or the like, configured or arranged to perform at least some of the actions of the flow chart in FIG. 3 as follows. Further, the wireless device 502 is, e.g. by means of units, modules or the like, configured or arranged to perform at least some of the actions of the flow chart in FIG. 4 as follows.

The network node 500 is arranged to handle discontinuous transmission, DTX, in a communication with a wireless device 502 served by the network node 500 on multiple uplink carriers. The network node 500 is operable to configure or obtain a primary uplink carrier with a first Transmission Time Interval, TTI, for the communication. This operation may be performed by a configuring unit 500A in the network node 500, as illustrated in action 300. The network node 500 is also operable to configure or obtain a secondary uplink carrier with a second TTI which is different than the first TTI for the communication. This operation may be performed by the configuring unit 500A, as illustrated in action 302. The configuring unit 500A could alternatively be named an assigning unit or obtaining unit. The network node 500 may also be operable to send or provide an assignment of the primary and secondary carriers to the wireless device 502 as illustrated in action 304.

The network node 500 is further operable to select values of DTX parameters defined for one of the first and second TTIs for the communication. This operation may be performed by a selecting unit 500B in the network node 500, as illustrated in action 306. The selecting unit 500B could alternatively be named a logic unit.

The network node 500 is further operable to instruct the wireless device 502 to use the selected values of DTX parameters for transmission on both the primary uplink carrier and the secondary uplink carrier. This operation may be performed by an instructing unit 500C in the network node 500 as illustrated in action 308. The instructing unit 500C could alternatively be named a DTX controlling unit or sending unit.

The wireless device 502 is arranged to employ discontinuous transmission, DTX, in a communication with a serving network node 500 on multiple uplink carriers. The wireless device 502 may be operable to receive or obtain a carrier assignment as illustrated in action 400. The wireless device 502 is operable to configure or obtain a primary uplink carrier with a first Transmission Time Interval, TTI, for the communication. This operation may be performed by a configuring unit 502A in the wireless device 502 as illustrated in action 402. The wireless device 502 is also operable to configure or obtain a secondary uplink carrier with a second TTI which is different than the first TTI for the communication. This operation may be performed by the configuring unit 502A as illustrated in action 404. The configuring unit 502A could alternatively be named an obtaining unit or activating unit.

The wireless device 502 is further operable to receive or obtain an instruction from the network node 500 to use values of DTX parameters defined for one of the first and second TTIs for transmission on both the primary uplink carrier and the secondary uplink carrier. This operation may be performed by a receiving unit 502B in the wireless device 502, as illustrated in action 406. The wireless device 502 is further operable to apply DTX according to said values of DTX parameters in the transmission on the primary and secondary uplink carriers. This operation may be performed by an applying unit 502C in the wireless device 502, as illustrated in action 408. The applying unit 502C could alternatively be named a DTX unit.

It should be noted that FIG. 5 illustrates various functional modules in the network node 500 and the wireless device 502, respectively, and the skilled person is able to implement these functional modules in practice using suitable software and hardware equipment. Thus, the solution is generally not limited to the shown structures of the network node 500 and the wireless device 502, and the functional units therein may be configured to operate according to any of the features, examples and embodiments described in this disclosure, where appropriate.

The functional modules 500A-C and 502A-C described above may be implemented in the network node 500 and the wireless device 502, respectively, by means of program modules of a respective computer program comprising code means which, when run by the processor P causes the network node 500 and the wireless device 502 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 500 and the wireless device 502 in the form of a memory having a computer readable medium and being connected to the processor P. The computer program product or memory M in each of the network node 500 and the wireless device 502 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 500 and wireless device 502.

The solution described herein may be implemented in each of the network node 500 and the wireless device 502 by a computer program comprising instructions which, when executed on at least one processor, cause the at least one processor to carry out the actions according to any of the above embodiments and examples, where appropriate. The solution may also be implemented at each of the network node 500 and the wireless device 502 in a program carrier containing the above computer program, wherein the program carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "network node", "wireless device", "carrier", "Transmission Time Interval, TTI" and "DTX parameters" have been used throughout this disclosure, although any other corresponding entities, functions, and/or parameters could also be used having the features and characteristics described here. The solution may be implemented according to the appended claims.

Below, it is summarized how the Modifications 1-8 mentioned above can be realized to enable the solution described herein.

Modification 1—Adding a new IE "Mixed TTI" in TS 25.433 in chapter 9.2.2.66 Continuous Packet Connectivity DTX-DRX Information as a new choice.

Modification 2—Adding a Continuous Packet Connectivity DTX-DRX Information in TS 25.433 in chapter 9.2.2.137 Additional E-DCH FDD Information.

Modification 3—Modify the Continuous Packet Connectivity DTX-DRX Information DTX Information in TS 25.433 in chapter 9.2.2.66. The 10 ms TTI DTX values are extended for UE DTX Cycle 1 and UE DTX Cycle 2.

Modification 4—Adding a new DTX Information IE in TS 25.433 in chapter 9.2.2.137 Additional E-DCH FDD Information. Only the values for 2 ms TTI are included.

Modification 5—Adding a new DTX Information IE in TS 25.433 in chapter 9.2.2.137 Additional E-DCH FDD Information. Both 10 ms TTI and 2 ms TTI values are included.

Modification 6—Adding a new IE "Mixed TTI" in TS 25.433 in chapter 9.2.2.66 Continuous Packet Connectivity DTX-DRX Information, different approach than in Modification 1.

Modification 7—Values for 2 ms TTI added to the 10 ms case for the primary carrier in TS 25.331 in chapter 10.3.6.34a DTX-DRX Information. DTX Information IE for 10 ms for secondary carrier added with both 10 ms TTI and 2 ms TTI values included, see table below where the modifications are underlined:

| Information Element/Group name | Type and reference | Semantics description | Version |
|---|---|---|---|
| DTX Information | | | REL-7 |
| >CHOICE E-DCH TTI length | | | REL-7 |
| >>10 ms | | | REL-7 |
| >>>UE DTX cycle 1 | Enumerated (1, 4, 5, 8, 10, 16, 20) | Units of subframes. | REL-7 |
| >>>UE DTX cycle 2 | Enumerated (4, 5, 8, 10, 16, 20, 32, 40, 64, 80, 128, 160) | Units of subframes. Two spare values are needed. | REL-7 |
| >>>MAC DTX cycle | Enumerated (5, 10, 20) | Units of subframes. One spare value is needed. | REL-7 |
| >>2 ms | | | REL-7 |
| >>>UE DTX cycle 1 | Enumerated (1, 4, 5, 8, 10, 16, 20) | Units of subframes. One spare value is needed. | REL-7 |
| >>>UE DTX cycle 2 | Enumerated (4, 5, 8, 10, 16, 20, 32, 40, 64, 80, 128, 160) | Units of subframes. Four spare values are needed. | REL-7 |
| >>>MAC DTX cycle | Enumerated (1, 4, 5, 8, 10, 16, 20) | Units of subframes. One spare value is needed. | REL-7 |
| >Inactivity Threshold for UE DTX cycle 2 | Enumerated (1, 4, 8, 16, 32, 64, 128, 256) | Units of E-DCH TTIs. Eight spare values are needed. | REL-7 |
| >Default SG in DTX Cycle 2 | Integer (0 . . . 37, 38) | Serving Grant value to be used at the transition in DTX-Cycle-2. (0 . . . 37) indicates E-DCH serving grant index; index 38 means zero grant. | REL-7 |
| >UE DTX long preamble length | Enumerated (4, 15) | Units of slots Default value is 2 slots | REL-7 |
| >MAC Inactivity Threshold | Enumerated (1, 2, 4, 8, 16, 32, 64, 128, 256, 512, Infinity) | Units of E-DCH TTIs. Five spare values are needed. | REL-7 |
| >CQI DTX Timer | Enumerated (0, 1, 2, 4, 8, 16, 32, 64, 128, 256, 512, Infinity) | Units of subframes. Four spare values are needed. | REL-7 |
| >UE DPCCH burst_1 | Enumerated (1, 2, 5) | Units of sub-frames. One spare value is needed. | REL-7 |
| >UE DPCCH burst_2 | Enumerated (1, 2, 5) | Units of sub-frames. One spare value is needed. | REL-7 |
| DTX Information for secondary uplink frequency | | | REL-12 |
| >CHOICE E-DCH TTI length | | | REL-12 |
| >>10 ms | NULL | | REL-12 |
| >>>UE DTX cycle 1 secondary | Enumerated (1, 4, 5, 8, 10, 16, 20) | Units of subframes. Default value is the value included in the IE "UE DTX cycle 1". One spare value is needed. | REL-14 |
| >>>UE DTX cycle 2 secondary | Enumerated (4, 5, 8, 10, 16, 20, 32, 40, 64, 80, 128, 160, 256, 320, 512, 640, 1024, 1280) | Units of subframes. Fourteen spare values are needed. | REL-14 |

| Information Element/Group name | Type and reference | Semantics description | Version |
|---|---|---|---|
| >Inactivity Threshold for UE DTX cycle 2 secondary | Enumerated (1, 4, 8, 16, 32, 64, 128, 256) | Units of E-DCH TTIs. Default value is the value included in the IE "Inactivity Threshold for UE DTX cycle 2". Eight spare values are needed. | REL-14 |
| >MAC DTX cycle | Enumerated (5, 10, 20, 1, 4, 8, 16) | Unit in subframes. | REL-14 |
| >>2 ms | | | REL-12 |
| >>>UE DTX cycle 1 secondary | Enumerated (1, 4, 5, 8, 10, 16, 20) | Units of subframes. Default value is the value included in the IE "UE DTX cycle 1". One spare value is needed. | REL-12 |
| >>>UE DTX cycle 2 secondary | Enumerated (4, 5, 8, 10, 16, 20, 32, 40, 64, 80, 128, 160, 256, 320, 512, 640, 1024, 1280) | Units of subframes. Fourteen spare values are needed. | REL-12 |
| >Inactivity Threshold for UE DTX cycle 2 secondary | Enumerated (1, 4, 8, 16, 32, 64, 128, 256) | Units of E-DCH TTIs. Default value is the value included in the IE "Inactivity Threshold for UE DTX cycle 2". Eight spare values are needed. | REL-12 |
| >MAC DTX cycle | Enumerated (5, 10, 20, 1, 4, 8, 16) | Unit in subframes. | REL-14 |

Modification 8—Example for Procedural Text Modification in TS 25.433, for RADIO LINK SETUP REQUEST/RADIO LINK ADDITION REQUEST/RADIO LINK RECONFIGURATION PREPARE for alternative B2:

| For Primary E-DCH, modify the procedure text | For Additional E-DCH, modify the procedure text |
|---|---|
| When Mixed TTI configuration is setting up for DB/DC HSUPA, 10 ms TTI UE DTX Cycle 1 and UE DTX Cycle 2 value are used. | When Mixed TTI configuration is setting up for DB/DC HSUPA, 10 ms TTI UE DTX Cycle 1 and UE DTX Cycle 2 value are used. |

The invention claimed is:

1. A method performed by a network node for handling discontinuous transmission (DTX) in a communication with a wireless device using multiple uplink carriers, the method comprising:
configuring or obtaining a primary uplink carrier with a first Transmission Time Interval (TTI) for the communication;
configuring or obtaining a secondary uplink carrier with a second TTI which is different than the first TTI for the communication, wherein the first and second TTIs are respective first and second transmission durations;
selecting values of DTX parameters defined for one of the first and second TTIs for the communication;
instructing the wireless device to use the selected values of DTX parameters for transmission on both the primary uplink carrier and the secondary uplink carrier; and
based on the second TTI being different than the first TTI, one of:
selecting values of DTX parameters as defined for the TTI of 2 ms for the communication on both carriers regardless of the TTIs configured on the primary uplink carrier and the secondary uplink carrier; and
selecting values of DTX parameters as defined for the TTI of 10 ms for the communication on both carriers regardless of the TTIs configured on the primary uplink carrier and the secondary uplink carrier.

2. The method according to claim 1, wherein the values of DTX parameters defined for the TTI of 10 ms is a subset of the values of DTX parameters defined for the TTI of 2 ms.

3. The method according to claim 1, wherein the DTX parameters comprise at least one of: a first DTX cycle 1, a second DTX cycle 2, and a Medium Access Control (MAC) DTX cycle.

4. The method according to claim 1, wherein said communication comprises reception of Dedicated Physical Control Channel (DPCCH) bursts from the wireless device.

5. A network node configured to handle discontinuous transmission (DTX) in a communication with a wireless device using multiple uplink carriers, wherein the network node comprises:
a communication circuit; and
one or more memories and at least one processor, the one or more memories storing instructions executable by the at least one processor whereby the network node is configured to:
configure or obtain a primary uplink carrier with a first Transmission Time Interval (TTI) for the communication;

configure or obtain a secondary uplink carrier with a second TTI which is different than the first TTI for the communication, wherein the first and second TTIs are respective first and second transmission durations;

select values of DTX parameters defined for one of the first and second TTIs for the communication; and instruct the wireless device to use the selected values of DTX parameters for transmission on both the primary uplink carrier and the secondary uplink carrier; and based on the second TTI being different than the first TTI, one of:

select values of DTX parameters as defined for the TTI of 2 ms for the communication on both carriers regardless of the TTIs configured on the primary uplink carrier and the secondary uplink carrier; and select values of DTX parameters as defined for the TTI of 10 ms for the communication on both carriers regardless of the TTIs configured on the primary uplink carrier and the secondary uplink carrier.

6. The network node according to claim 5, wherein the first TTI is 10 ms and the second TTI is 2 ms, or wherein the first TTI is 2 ms and the second TTI is 10 ms.

7. The network node according to claim 6, wherein the network node is configured to select values of DTX parameters as defined for the TTI of 2 ms for the communication on both carriers regardless of the TT's configured on the primary uplink carrier and the secondary uplink carrier.

8. The network node according to claim 6, wherein the network node is configured to select values of DTX parameters as defined for the TTI of 10 ms for the communication on both carriers regardless of the TTIs configured on the primary uplink carrier and the secondary uplink carrier.

9. The network node according to claim 7, wherein the values of DTX parameters defined for the TTI of 10 ms is a subset of the values of DTX parameters defined for the TTI of 2 ms.

10. The network node according to claim 7, wherein the DTX parameters comprise at least one of: a first DTX cycle 1, a second DTX cycle 2, and a Medium Access Control (MAC) DTX cycle.

11. The network node according to claim 7, wherein said communication comprises reception of Dedicated Physical Control Channel (DPCCH) bursts from the wireless device.

12. A method performed by a wireless device for employing discontinuous transmission (DTX) in a communication with a serving network node on multiple uplink carriers, the method comprising:

configuring or obtaining a primary uplink carrier with a first Transmission Time Interval (TTI) for the communication;

configuring or obtaining a secondary uplink carrier with a second TTI which is different than the first TTI for the communication, wherein the first and second TTIs are respective first and second transmission durations;

receiving an instruction from the serving network node to use values of DTX parameters defined for one of the first and second TTIs for transmission on both the primary uplink carrier and the secondary uplink carrier;

applying DTX according to said values of DTX parameters in the transmission on the primary and secondary uplink carriers; and based on the second TTI being different than the first TTI, one of:

selecting values of DTX parameters as defined for the TTI of 2 ms for the communication on both carriers regardless of the TTIs configured on the primary uplink carrier and the secondary uplink carrier; and selecting values of DTX parameters as defined for the TTI of 10 ms for the communication on both carriers regardless of the TTIs configured on the primary uplink carrier and the secondary uplink carrier.

13. The method according to claim 12, wherein the first TTI is 10 ms and the second TTI is 2 ms, or wherein the first TTI is 2 ms and the second TTI is 10 ms.

14. The method according to claim 13, wherein said values of DTX parameters are defined for the TTI of 2 ms for the communication on both carriers regardless of the TTIs configured on the primary uplink carrier and the secondary uplink carrier.

15. The method according to claim 13, wherein said values of DTX parameters are defined for the TTI of 10 ms for the communication on both carriers regardless of the TTIs configured on the primary uplink carrier and the secondary uplink carrier.

16. The method according to claim 14, wherein the values of DTX parameters defined for the TTI of 10 ms is a subset of the values of DTX parameters defined for the TTI of 2 ms.

17. The method according to claim 14, wherein the DTX parameters comprise at least one of: a first DTX cycle 1, a second DTX cycle 2, and a Medium Access Control (MAC) DTX cycle.

18. The method according to claim 12, wherein said communication comprises transmission of Dedicated Physical Control Channel (DPCCH) bursts by the wireless device.

19. A wireless device configured to employ discontinuous transmission (DTX) in a communication with a serving network node on multiple uplink carriers, wherein the wireless device comprises:

a communication circuit; and one or more memories and at least one processor, the one or more memories storing instructions executable by the at least one processor whereby the wireless device is configured to:

configure or obtain a primary uplink carrier with a first Transmission Time Interval (TTI) for the communication;

configure or obtain a secondary uplink carrier with a second TTI which is different than the first TTI for the communication, wherein the first and second TTIs are respective first and second transmission durations;

receive an instruction from the serving network node to use values of DTX parameters defined for one of the first and second TTIs for transmission on both the primary uplink carrier and the secondary uplink carrier; and apply DTX according to said values of DTX parameters in the transmission on the primary and secondary uplink carriers; and based on the second TTI being different than the first TTI, one of:

select values of DTX parameters as defined for the TTI of 2 ms for the communication on both carriers regardless of the TTIs configured on the primary uplink carrier and the secondary uplink carrier; and select values of DTX parameters as defined for the TTI of 10 ms for the communication on both carriers regardless of the TTIs configured on the primary uplink carrier and the secondary uplink carrier.

20. The wireless device according to claim 19, wherein the first TTI is 10 ms and the second TTI is 2 ms, or wherein the first TTI is 2 ms and the second TTI is 10 ms.

21. The wireless device according to claim 20, wherein said values of DTX parameters are defined for the TTI of 2 ms for the communication on both carriers regardless of the TTIs configured on the primary uplink carrier and the secondary uplink carrier.

22. The wireless device according to claim 20, wherein said values of DTX parameters are defined for the TTI of 10 ms for the communication on both carriers regardless of the TTIs configured on the primary uplink carrier and the secondary uplink carrier.

23. The wireless device according to claim 21, wherein the values of DTX parameters defined for the TTI of 10 ms is a subset of the values of DTX parameters defined for the TTI of 2 ms.

24. The wireless device according to claim 19, wherein the DTX parameters comprise at least one of: a first DTX cycle 1, a second DTX cycle 2, and a Medium Access Control (MAC) DTX cycle.

25. The wireless device according to claim 19, wherein said communication comprises transmission of Dedicated Physical Control Channel (DPCCH) bursts by the wireless device.

26. The wireless device according to claim 19, the one or more memories storing instructions executable by the at least one processor whereby the serving network node is configured to:
perform transmissions, on the primary uplink carrier, that have each a duration equal to the first TTI; and
perform transmissions, on the secondary uplink carrier, that have each a duration equal to the second TTI.

27. A network node configured to handle discontinuous transmission (DTX) in a communication with a wireless device using multiple uplink carriers, wherein the network node comprises:
a communication circuit; and
one or more memories and at least one processor, the one or more memories storing instructions executable by the at least one processor whereby the network node is configured to:
configure or obtain a primary uplink carrier with a first Transmission Time Interval (TTI) for the communication;
configure or obtain a secondary uplink carrier with a second TTI which is different than the first TTI for the communication, wherein the first and second TTIs are respective first and second transmission durations;
select values of DTX parameters defined for one of the first and second TT's for the communication; and
instruct the wireless device to use the selected values of DTX parameters for transmission on both the primary uplink carrier and the secondary uplink carrier,
the values of DTX parameters defined for the first TTI being defined for use on any uplink carrier configured with the first TTI, the values of DTX parameters defined for the second TTI being defined for use on any uplink carrier configured with the second TTI, and the values of DTX parameters defined for one of the first and second TTIs being selected for use on both the primary uplink carrier and the secondary uplink carrier based on the second TTI being different than the first TTI.

28. A wireless device configured to employ discontinuous transmission (DTX) in a communication with a serving network node on multiple uplink carriers, wherein the wireless device comprises:
a communication circuit; and
one or more memories and at least one processor, the one or more memories storing instructions executable by the at least one processor whereby the wireless device is configured to:
configure or obtain a primary uplink carrier with a first Transmission Time Interval (TTI) for the communication;
configure or obtain a secondary uplink carrier with a second TTI which is different than the first TTI for the communication, the first and second TTIs being respective first and second transmission durations;
receive an instruction from the serving network node to use values of DTX parameters defined for one of the first and second TTIs for transmission on both the primary uplink carrier and the secondary uplink carrier; and
apply DTX according to said values of DTX parameters in the transmission on the primary and secondary uplink carriers,
the values of DTX parameters defined for the first TTI being defined for use on any uplink carrier configured with the first TTI, the values of DTX parameters defined for the second TTI being defined for use on any uplink carrier configured with the second TTI, and the instruction to use values of DTX parameters defined for one of the first and second TTIs on both the primary uplink carrier and the secondary uplink carrier being received based on the second TTI being different than the first TTI.

* * * * *